(12) United States Patent
Kahn et al.

(10) Patent No.: US 8,040,382 B2
(45) Date of Patent: Oct. 18, 2011

(54) METHOD AND APPARATUS FOR IMPROVING PHOTO IMAGE QUALITY

(75) Inventors: Philippe Kahn, Aptos, CA (US); Venkat Easwar, Los Gatos, CA (US); Arthur Kinsolving, Santa Cruz, CA (US)

(73) Assignee: DP Technologies, Inc., Scotts Valley, CA (US)

( * ) Notice: Subject to any disclaimer, the term of this patent is extended or adjusted under 35 U.S.C. 154(b) by 488 days.

(21) Appl. No.: 11/970,499

(22) Filed: Jan. 7, 2008

(65) Prior Publication Data

US 2009/0174782 A1 Jul. 9, 2009

(51) Int. Cl.
*H04N 5/228* (2006.01)
(52) U.S. Cl. ............ 348/208.99; 348/208.1; 348/208.2; 348/208.4
(58) Field of Classification Search ................ None
See application file for complete search history.

(56) References Cited

U.S. PATENT DOCUMENTS

| | | | |
|---|---|---|---|
| 4,238,146 A | 12/1980 | Kitamura et al. | |
| 5,192,964 A * | 3/1993 | Shinohara et al. | 396/55 |
| 5,430,480 A | 7/1995 | Allen et al. | |
| 5,708,863 A | 1/1998 | Satoh et al. | |
| 5,717,611 A | 2/1998 | Terui et al. | |
| 5,790,490 A | 8/1998 | Satoh et al. | |
| 6,374,054 B1 | 4/2002 | Schinner | |
| 6,396,883 B2 * | 5/2002 | Yang et al. | 375/340 |
| 6,470,147 B1 | 10/2002 | Imada | |
| 6,628,898 B2 * | 9/2003 | Endo | 396/51 |
| 7,027,087 B2 | 4/2006 | Nozaki et al. | |
| 7,042,509 B2 | 5/2006 | Onuki | |
| 7,212,230 B2 * | 5/2007 | Stavely | 348/208.1 |
| 7,689,107 B2 | 3/2010 | Enomoto | |
| 7,705,884 B2 * | 4/2010 | Pinto et al. | 348/208.99 |
| 2002/0006284 A1 | 1/2002 | Kim | |
| 2002/0054214 A1 | 5/2002 | Yoshikawa | |
| 2002/0150302 A1 | 10/2002 | McCarthy et al. | |
| 2003/0151672 A1 | 8/2003 | Robins et al. | |
| 2004/0047498 A1 * | 3/2004 | Mulet-Parada et al. | 382/128 |
| 2004/0081441 A1 | 4/2004 | Sato et al. | |
| 2004/0106958 A1 | 6/2004 | Mathis et al. | |
| 2004/0130628 A1 | 7/2004 | Stavely | |
| 2004/0135898 A1 | 7/2004 | Zador | |
| 2004/0247030 A1 * | 12/2004 | Wiethoff | 375/240.16 |
| 2005/0078197 A1 | 4/2005 | Gonzales | |
| 2005/0157181 A1 | 7/2005 | Kawahara et al. | |

(Continued)

FOREIGN PATENT DOCUMENTS

JP 7020547 A 1/1995

OTHER PUBLICATIONS

International Search Report and Written Opinion, PCT/US09/30223, mailed Feb. 23, 2009.

(Continued)

*Primary Examiner* — Anthony J Daniels
(74) *Attorney, Agent, or Firm* — Blakely, Sokoloff, Taylor & Zafman LLP; Judith A. Szepesi

(57) ABSTRACT

A method and apparatus for receiving motion data and determining acceleration vectors based on biomechanical data and the received motion data. The method further comprises creating an improved image based on the acceleration vectors.

27 Claims, 14 Drawing Sheets

U.S. PATENT DOCUMENTS

| | | | |
|---|---|---|---|
| 2005/0168587 A1* | 8/2005 | Sato et al. | 348/208.99 |
| 2005/0203430 A1 | 9/2005 | Williams et al. | |
| 2005/0243178 A1 | 11/2005 | McConica | |
| 2006/0029284 A1 | 2/2006 | Stewart | |
| 2006/0257042 A1* | 11/2006 | Ofek et al. | 382/255 |
| 2007/0263995 A1 | 11/2007 | Park et al. | |
| 2008/0030586 A1 | 2/2008 | Helbing et al. | |
| 2008/0231713 A1 | 9/2008 | Florea et al. | |
| 2008/0231714 A1 | 9/2008 | Estevez et al. | |
| 2009/0017880 A1 | 1/2009 | Moore et al. | |
| 2009/0067826 A1 | 3/2009 | Shinohara et al. | |

OTHER PUBLICATIONS

DP Technologies, Inc. Office Action for U.S. Appl. No. 11/970,499 mailed Jul. 28, 2010.

PCT International Preliminary Report on Patentability, International Application No. PCT/US09/30223, 15 pages.

Ang, Wei Tech, et al, "Zero Phase Filtering for Active Compensation of Period Physiological Motion," Proc 1st IEEE / RAS-EMBS International Conference on Biomedical Robotics and Biomechatronics, Feb. 20-22, 2006, pp. 182-187.

EP 09700881.7, European Search Report, dated May 3, 2011, 8 pages.

RICOH, "Advanced digital technology changes creativity," <http://www.ricoh.com/r_dc/gx/gx200/features2.html>, Accessed May 12, 2011, 4 pages.

Tech, Ang Wei, "Real-time Image Stabilizer," <http://www.mae.ntu.edu.sg/ABOUTMAE/DIVISIONS/RRC_BIOROBOTICS/Pages/rtimage.aspx>, Mar. 23, 2009, 3 pages.

PCT International Preliminary Report on Patentability, International Application No. PCT/US09/30223, mailed Nov. 18, 2010, 14 pages.

DP Technologies, Inc. Notice of Allowance for U.S. Appl. No. 12/424,492 mailed Jan. 7, 2011.

DP Technologies, Inc. Notice of Allowance for U.S. Appl. No. 11/580,947 mailed Oct. 1, 2010.

DP Technologies Office Action for U.S. Appl. No. 11/580,947 mailed Jun. 4, 2010.

DP Technologies Office Action for U.S. Appl. No. 11/580,947 mailed Nov. 25, 2009.

DP Technologies Office Action for U.S. Appl. No. 11/580,947 mailed Jun. 22, 2009.

DP Technologies Office Action for U.S. Appl. No. 11/580,947 mailed Jan. 30, 2009.

\* cited by examiner

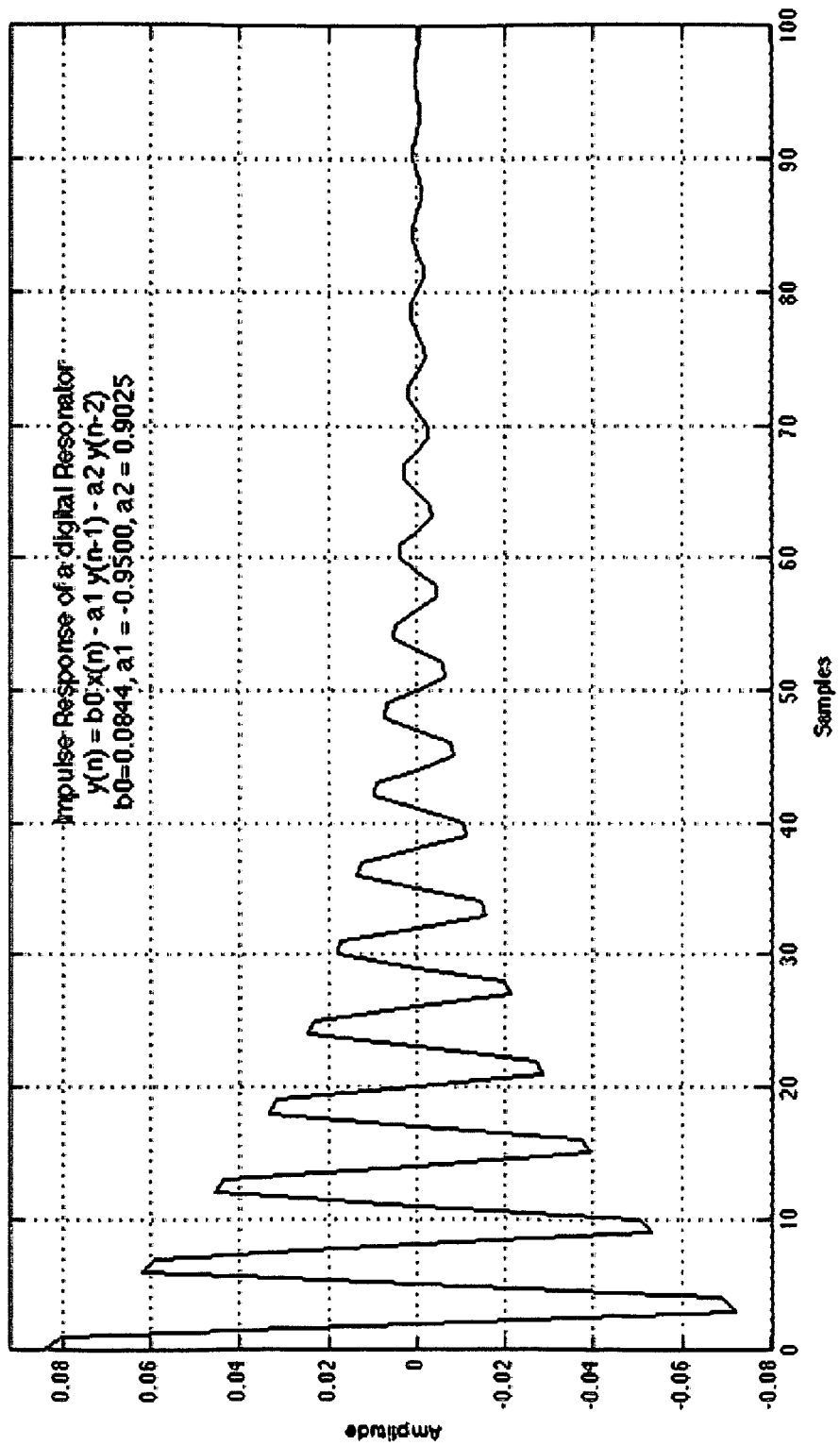
Fig. 3A Digital Resonator Impulse Response

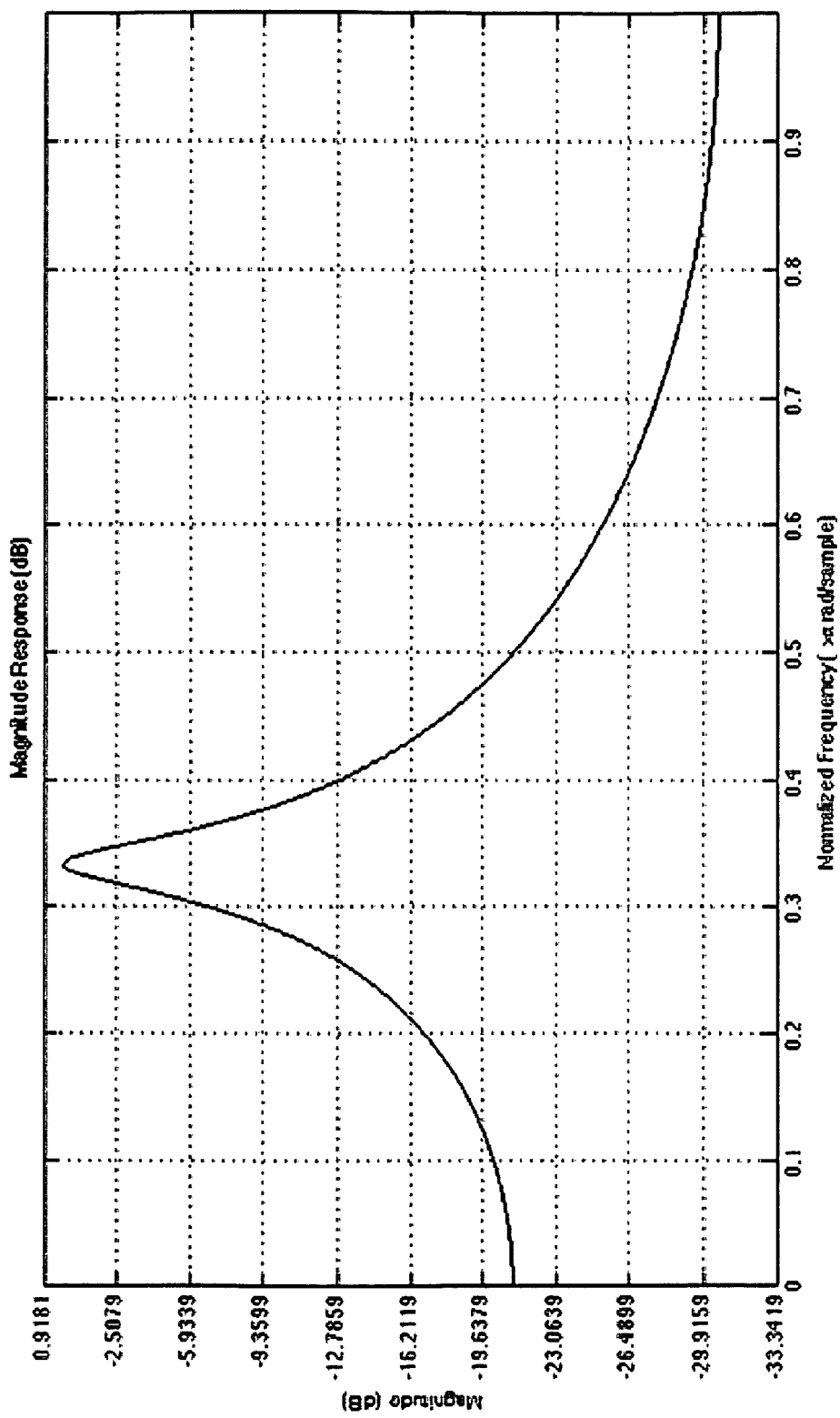
Fig. 3B Digital Resonator Frequency Response

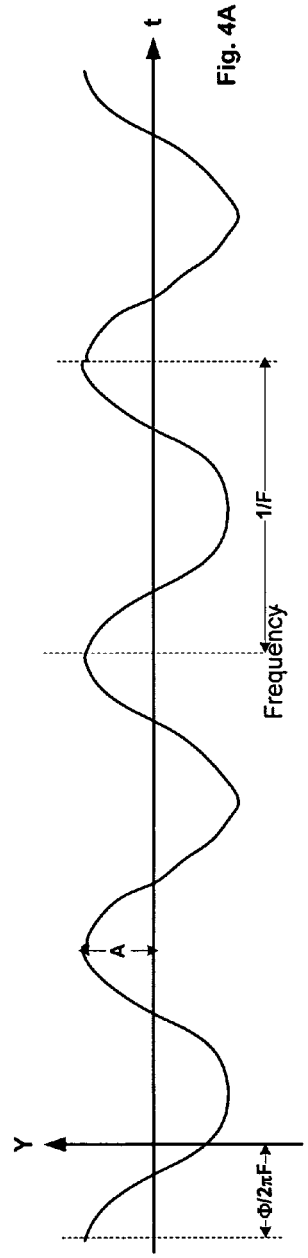
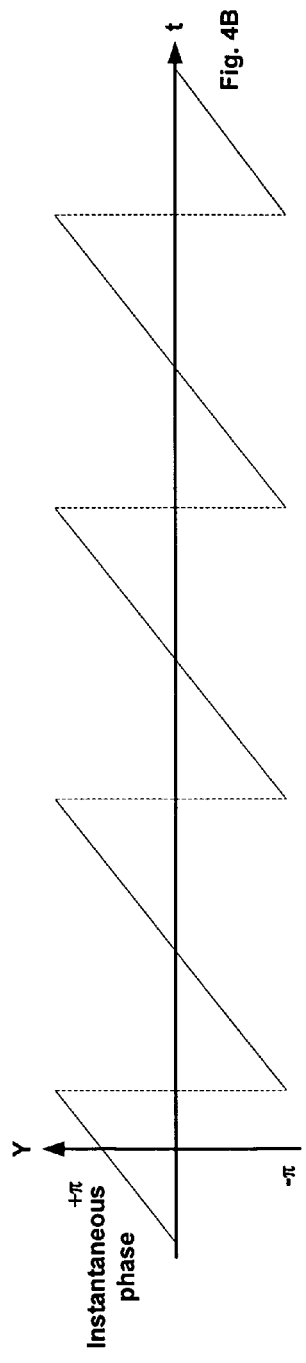
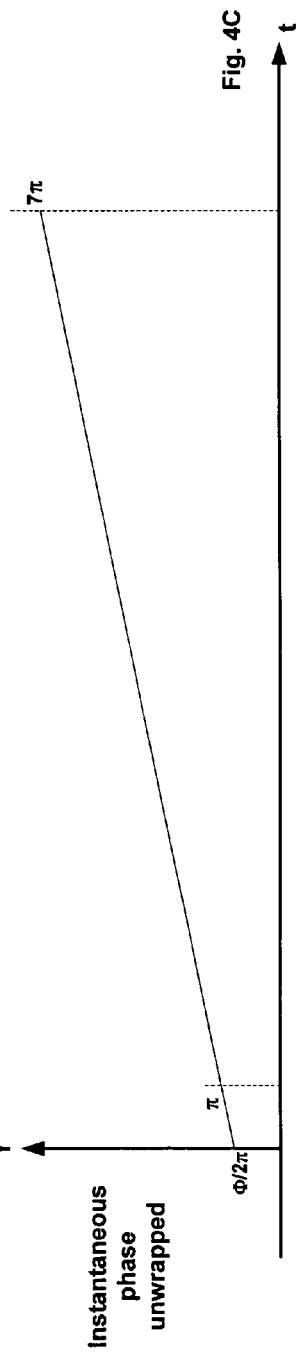
Fig. 4A
Fig. 4B
Fig. 4C

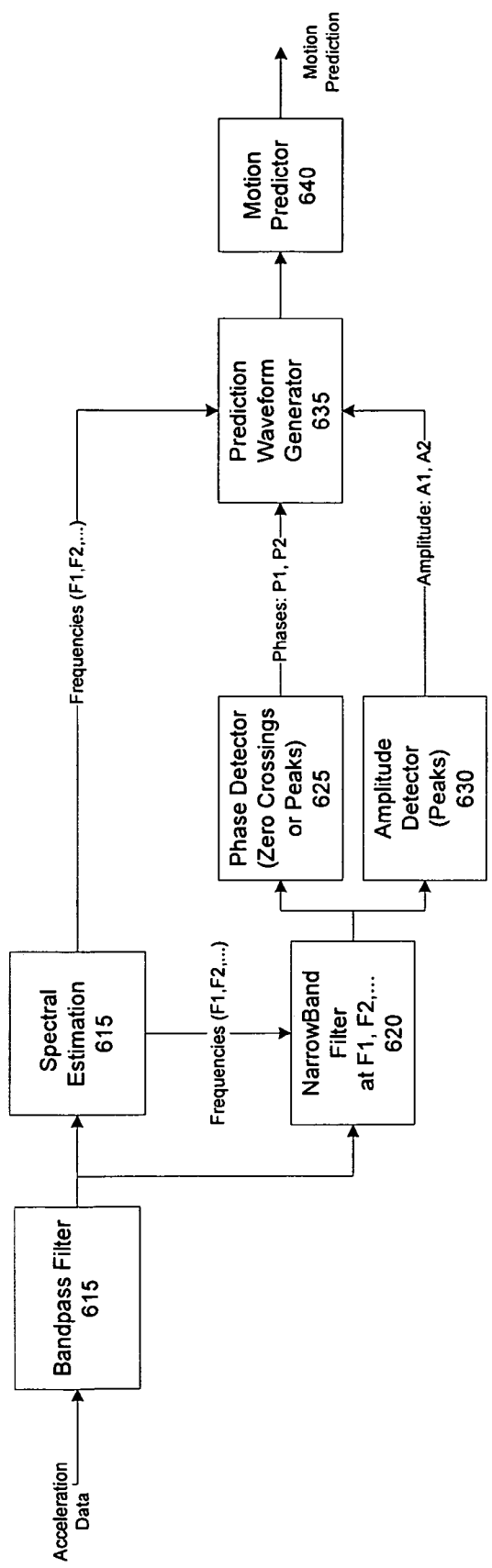
Fig. 6A Predictive Stabilization – Spectral Analysis Approach A

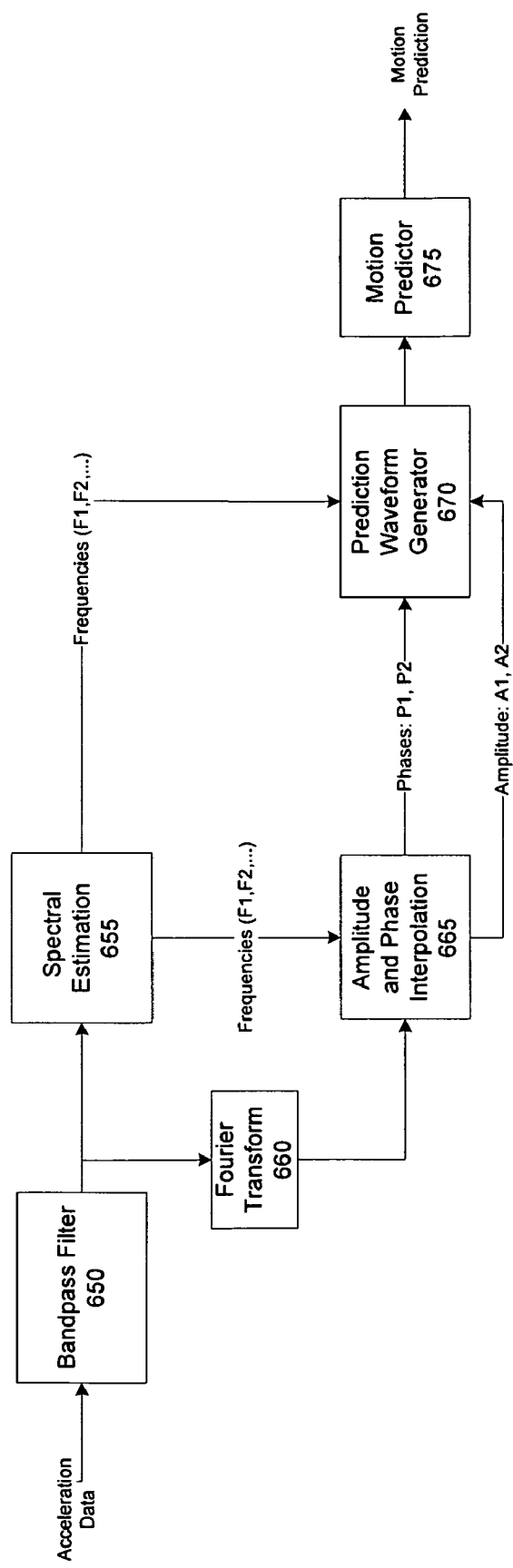
Fig. 6B Predictive Stabilization – Spectral Analysis Approach

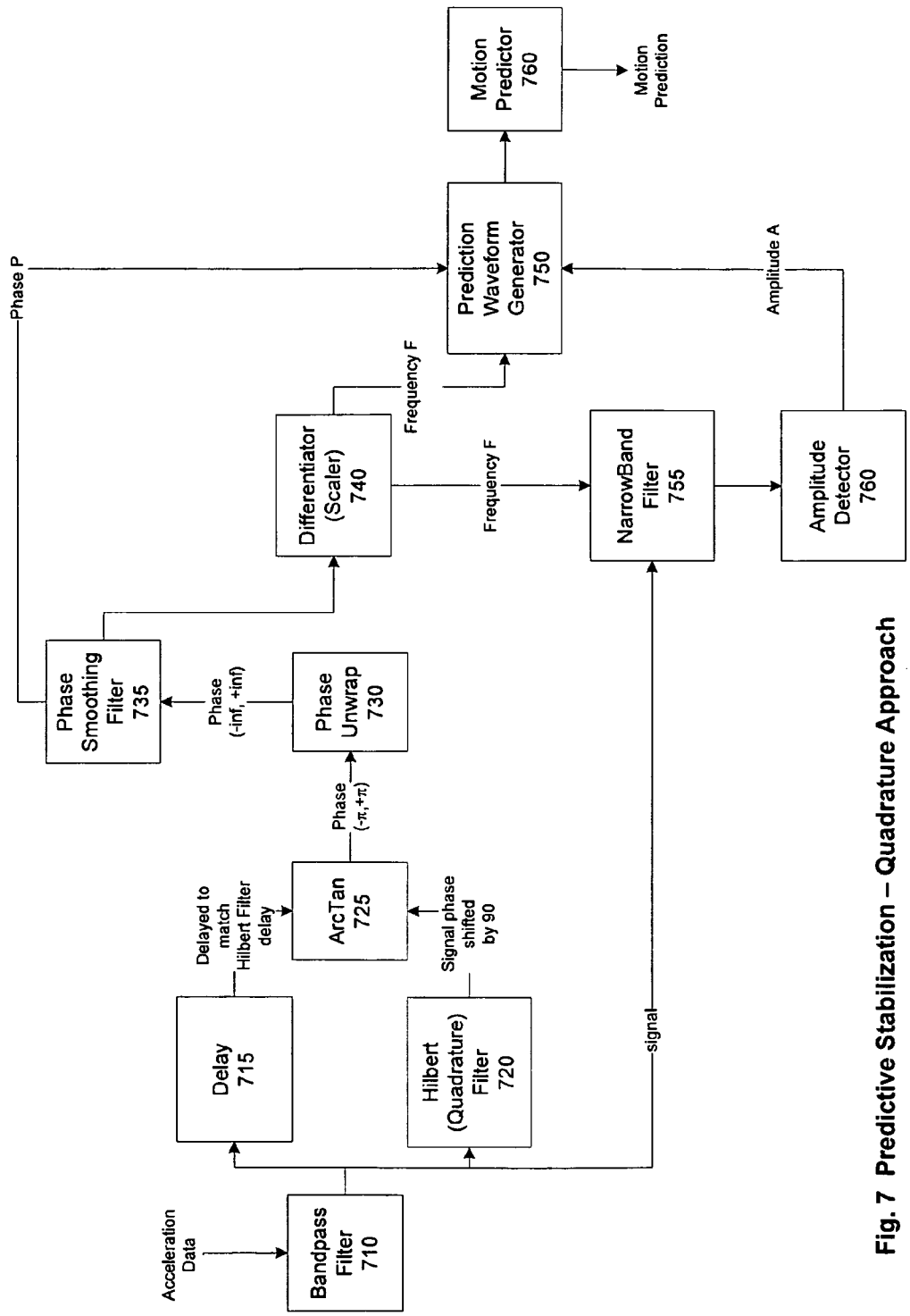
Fig. 7 Predictive Stabilization – Quadrature Approach

Motion Blur Deconvolution

Image Blurred with the Point Spread Function that represents linear motion at 30 degree angle Weiner restoration using incorrect Motion PSF that assumes uniform blurring Original Image Weiner restoration using correct Motion PSF

METHOD AND APPARATUS FOR IMPROVING PHOTO IMAGE QUALITY

FIELD OF THE INVENTION

The present invention relates to image stabilization, and more particularly to using motion data to improve photo image quality.

BACKGROUND

The problem of blurred images resulting form human hand motion is well known in the photography field. Human hand motion includes tremors, jitter, accidental motions, etc. Though tripods have been used to secure cameras and eliminate motion, they are bulky and are rarely used for amateur photography. Instead electronic, electro-mechanical stabilization schemes are typically used in higher end digital cameras. Two approaches to image stabilization are popular.

Feedback stabilization systems use sensors like gyroscopes to measure rotational motion and feed a compensating signal to actuators that adjust the sensor and/or lens position to compensate for the motion. However, actuators are expensive and consume a lot of power.

Post-processing Systems process the captured image(s) to compensate for blur and motion. The degree of motion is inferred by analyzing the image(s). However, this analysis is extremely computing intensive and time consuming.

SUMMARY OF THE INVENTION

A method and apparatus for receiving motion data and determining acceleration vectors based on biomechanical data and the received motion data. The method further comprises creating an improved image based on the acceleration vectors.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3A is a graph showing the impulse response of an AR model.

FIG. 3B is a graph showing the frequency response of the AR model.

FIGS. 4A-C are graphs of motion curves.

FIG. 6A is a diagram of one embodiment of predictive stabilization based on spectral estimation.

FIG. 6B is a diagram of an alternative embodiment of predictive stabilization based on spectral estimation.

FIG. 7 is a diagram of one embodiment of predictive stabilization based on quadrature signal processing.

DETAILED DESCRIPTION

Figure 1:
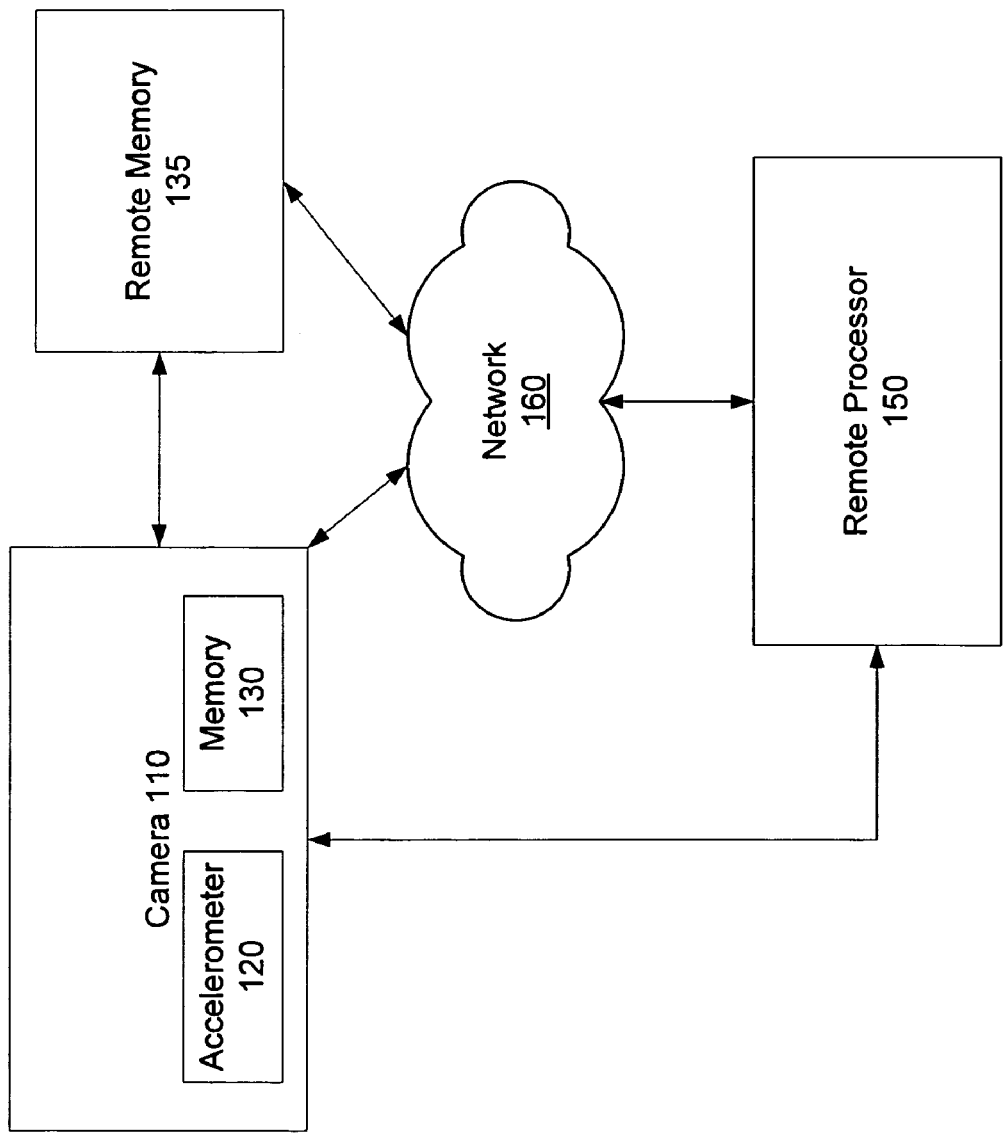
FIG. 1 is a network diagram of a system which may be used with the present invention.

The method and apparatus described uses motion analysis using an accelerometer or other motion detection mechanism. The motion data is combined with knowledge of the biomechanics of human arm motion to improve captured picture quality. The motion analysis can be used in a predictive mode to anticipate the best moment to capture a picture and/or in post-processing mode to improve the image once it has been taken.

The approach differs from conventional image stabilization methods that are based on Feedback Stabilization or Post-processing of image data. Unlike Feedback Stabilization systems, the method in accordance with the present invention does not require actuators to adjust the lens or the image sensor. This substantially reduces the cost as well as power consumption associated with the camera, compared to a camera which includes feedback systems that use actuators. Unlike traditional Post-processing systems, the motion analysis is performed on detected motion data, not the image data. By utilizing motion data from an accelerometer or other acceleration or velocity detection mechanism, instead of analyzing image sequences to determine the optimal image or to interpolate an optimal image, the processing complexity is significantly reduced. The prior art Post-processing methods have a processing complexity that is at least proportional to the number of pixels in the image and hence degrade in performance with improved image sensor resolution. In contrast, using motion data enables scaling to larger image size without significantly increasing the processing complexity.

As noted above, the present system uses one or more acceleration or velocity detectors. In one embodiment, the detector is an accelerometer. In another embodiment, the detector may be a gyroscope. For simplicity the discussion below will use an "accelerometer." However, one of skill in the art would understand that any velocity or acceleration sensors may be used. Furthermore, the term "accelerometer" may refer to multiple accelerometers. The system is designed to provide analysis of the sinusoids derived from acceleration, velocity, displacement, or angular velocity data.

Though the description above uses acceleration vectors as an illustration, the sinusoidal analysis can be equally applied to displacement and velocity vectors. Further, harmonic motion exist in both linear (simple pendulum) and angular (torsion pendulum) terms as well. As such, harmonic analysis and prediction discussed is equally applicable to angular displacements, velocities, and accelerations. Therefore, at its most basic, the system utilizes the sinusoidal analysis on motion data, regardless of the type of sensor providing motion data, and the type of motion data provided.

In one embodiment, the system uses a prediction of amount of relative motion. This is done by frequency/harmonic analysis. This prediction does not require computation of a motion vector. The system uses the frequency/harmonic analysis to predict points of maximum and minimum motion. This technique applies to displacements and velocities, as well as to the angular space as described above.

In one embodiment, knowledge of biomechanics is used to constrain the problem space. Biomechanics here refers to the body's range of motion. When someone is holding a camera, for example, the shoulder and elbow joints provide a range of motion for the camera, as do other joints. In one embodiment, biomechanical extrapolation may be used to estimate the motion blur associated with a picture without analyzing the picture data. It may be used to predict an expected path or pattern of motion and thereby predict the picture blur into the future. This prediction can be used to drive the camera subsystem to capture pictures at the optimal times to maximize image quality.

In one embodiment, motion data may also be used to estimate the motion of the sensor and thereby derive knowledge of picture or inter-picture (per picture line) blur. This knowledge is used, in one embodiment, to guide post-processing algorithms so that the processing complexity associated with these algorithms is substantially reduced. This has the additional benefit of reducing the power consumed by the CPU, thereby prolonging battery life.

FIG. 1 is a network diagram of one embodiment of a system in which the present invention may be used. The camera 110 includes a motion sensor 120. The motion sensor 120, in one embodiment, is an accelerometer. The images taken by the camera are stored in memory 130. In one embodiment, motion data associated with the image is also stored in memory 130. In one embodiment, motion data is stored as metadata associated with the image. In one embodiment, memory 130 may include remote memory 135.

In one embodiment, post-processing takes place on a remote system 150. The data may be transferred to the remote system 150 via a direct connection (e.g. cable, or similar integral system), a network connection 160 (Internet, Ethernet, Bluetooth, cellular network, etc.), or other connection means. Post-processing may also be split between the camera 110 and remote system 150. In one embodiment, the remote system 150 may be another camera, a server computer, a personal computer, or any other computing platform which can obtain data from camera 110. Camera 110 may also be any handheld device capable of taking pictures including a camera phone, a personal digital assistant (PDA), a laptop with a webcam, a webcam, etc.

Figure 2:
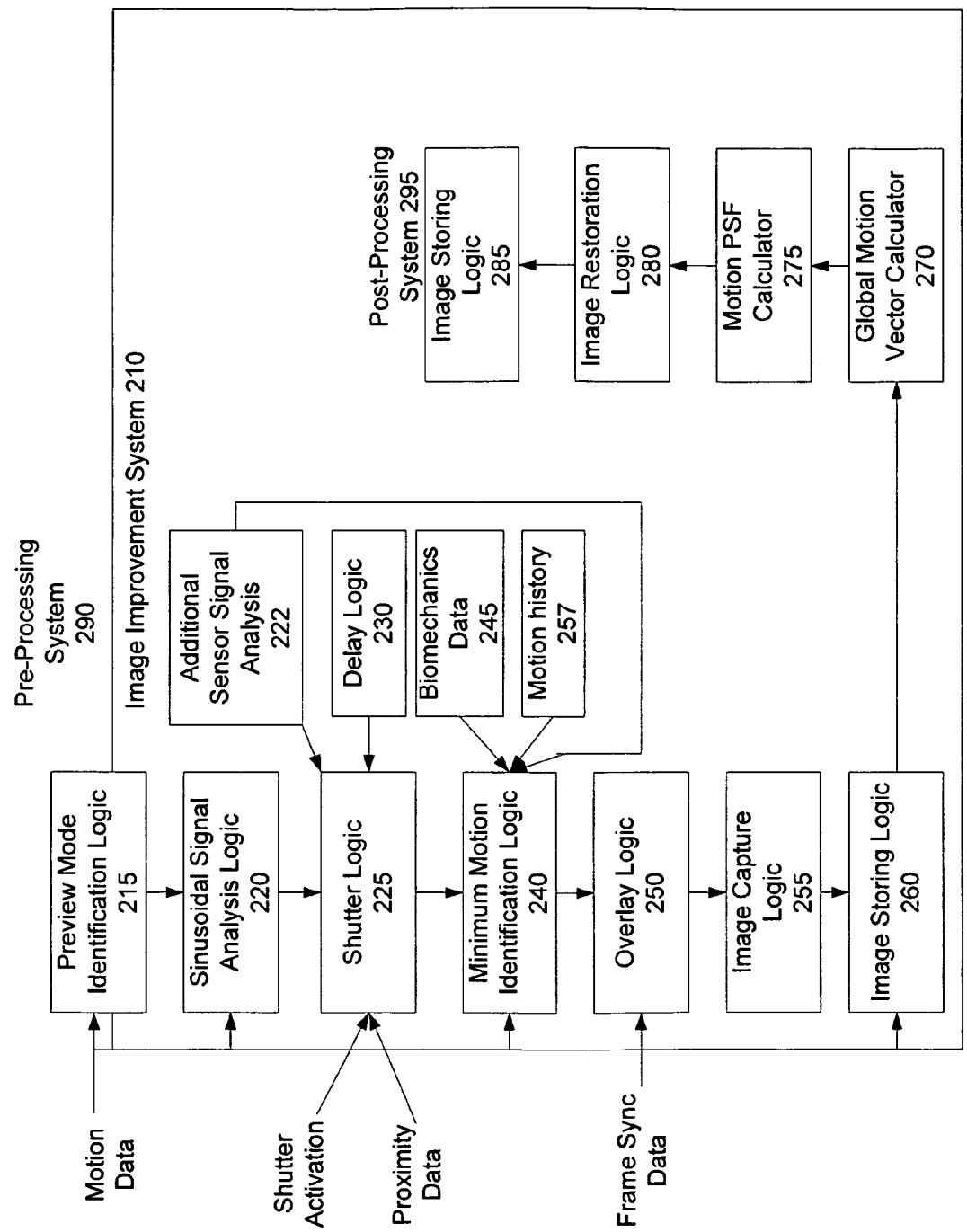
FIG. 2 is a block diagram of one embodiment of the image improvement mechanism.

FIG. 2 is a block diagram of one embodiment of the image improvement system in accordance with the present invention. In one embodiment, the system includes a pre-processing system 290 and a post-processing system 295. In one embodiment, while the logic elements are described separately, the hardware and software elements used to implement them may be shared, and any element may be utilized for both pre- and post-processing.

Preview mode identification logic 215 identifies when the camera is in preview mode. In one embodiment, this occurs when the camera aperture is open. In one embodiment, this occurs when the shutter button is pressed half-way, as for focus in an automatic camera.

Sinusoidal signal analysis logic 220 receives motion data, and analyzes the motion data. Additional sensor analysis logic 222 receives data from additional sensors, and uses that additional sensor data to control the image quality. For example, the additional sensor may be a cardiac sensor, used to control a delay and/or predict a motion waveform. Shutter logic 225 controls the shutter. In one embodiment, shutter logic 225 detects shutter activation. In another embodiment, shutter logic 225 includes a proximity sensor to detect the user's finger proximity, and activates the shutter (as controlled by other factors) prior to the user actually pressing the shutter activation button. In one embodiment, if shutter logic 225 detects shutter activation, delay logic 230 adds a small delay after shutter activation to compensate for the hand tremors which result from the shutter activation.

Minimum motion identification logic 240 uses current acceleration signal analysis data, and motion history data 247, along with biomechanics information 245 to predict local minima of motion. In one embodiment, sinusoids are calculated based on the motion data. This will be described in more detail below. Minimum motion is identified, and overlay logic 250 correlates the minimum motion point to frame sync information. Image capture logic 255 is activated by overlay logic 250. Image storing logic 260 stores the captured image. In one embodiment, the motion data captured concurrently with the image is also stored. The motion data may be a single reading of an accelerometer, associated with the entire image. The motion data may be more detailed, and provide motion context ranging from single pixel to the entire image. In one embodiment, an accelerometer reading is associated with each line in the image.

Post-processing system 295 utilizes the stored image, and associated motion data. Global motion vector calculator calculates the motion of the camera—as opposed to the motion of the subject of the image itself. The global motion vector data is then used to calculate a "Point Spread Function" (PSF), a per pixel blur. This is done by Motion PSF calculator 275. Image restoration logic 280 then adjusts the image, based on the PSF. And image string logic 285 stores the post-processed and improved image.

In this way, the present system can utilize motion data in pre-processing and post-processing contexts.

In one embodiment, knowledge of the biomechanics of the human tremor, i.e. involuntary motions, is used to drive the Image Stabilization system. There is extensive literature on tremor in the biomedical area. It is now widely accepted that the human hand tremor originates from two primary sources.

A first source is mechanical-reflex oscillations. The mechanical properties of the limbs and associated muscles, like elasticity, viscosity, etc., are such that damped oscillations are produced for pulsatile or impulse inputs. The frequency of the oscillation, F is equal to $$\sqrt{\frac{K}{I}},$$

where K represents limb stiffness, and I represents limb inertia. The impulse input for the oscillations come from cardioballistic inputs (associated with the heart pushing blood through the circulatory system) and through random nervous motor unit firings.

Typical oscillatory frequencies are 25 Hz for fingers, 6-8 Hz for wrist/hand, 3-4 Hz for elbow, 0.5-2 Hz for shoulder joint. While different individuals may have different tremor frequencies, an individual's tremor frequencies and patterns are generally consistent.

Another cause of tremors is central (nervous system) oscillations. The human nervous system is oscillatory in nature. It has been postulated that such oscillations in the nervous system cause corresponding oscillations in the arm. These oscillatory frequencies are independent of limb mechanics.

For normal people these are much smaller than mechanical-reflex oscillations above. But for people with pathological conditions like Parkinson's, such oscillations can dominate the mechanical-reflex oscillation.

Accelerometers have been used in the biomedical area to analyze human hand tremor. Typically, the accelerometer time series data generated is subject to spectrum estimation techniques to get the power spectral density of the tremor. The nature of the tremor, whether physiological (normal) or pathological is determined by analyzing the spectral data.

An Auto Regressive (AR) model driven by white noise is a good descriptor of the tremor time series of physiological subjects. This is not surprising, since AR models represent damped oscillators. In the AR model, the current output is modeled as a linear combination of the current input and past inputs:

$$y(n) = x(n) - \sum_{k=1}^{P} a_k y(n-k) \quad \text{(Equation 1)}$$

Where, x is the (white noise) input, y is the output, $\alpha_k$ are the AR coefficients, and p is the order of the AR model.

The order 2 process, p=2, represents a digital resonator and is a good representation of the tremor data. This model represents a transfer function that responds to an impulse input, with an output that is a damped sinusoidal wave with a peak resonating frequency determined by its AR coefficients.

For example, the impulse response and frequency response of the AR model y(n)=0.0844x(n)+0.95y(n−1)−0.0925y(n−2) are shown in FIG. 3A and FIG. 3B respectively. The damped sinusoidal response and the peak resonating frequency can be seen in the graphs. Thus, the motion can be modeled based on sinusoids, derived from the motion data.

Image Blur

Image blur can be classified into two types: camera motion blur and object motion blur. The present system attempts to minimize the camera motion blur. Deducing the motion blur associated with a camera is a complex problem, but one can exploit knowledge of biomechanics to address this problem. As noted above, one cause of camera motion blur is body tremors. The present invention in one embodiment, attempts to remove the effect of body tremors. This is done by modeling the tremor motion resulting from a joint and corresponding limb as an approximation of a simple harmonic motion at the joint and limb system's oscillating/resonant frequency.

In one embodiment, the dominant oscillating frequency of the hand is determined by spectral analysis of the accelerometer signal. Subsequently the phase of the oscillation is determined through phase estimation techniques. The oscillation is in one embodiment modeled as a Simple Harmonic Motion. For such motion the velocity is minimum at the peaks and valleys of acceleration and maximum at the zeroes. This information is used to predict optimal picture capture times as those of peaks and valleys of the predicted acceleration signal.

In one embodiment, the system may use one of three approaches for predictive motion/blur estimation to remove tremor-caused blur. The three approaches are: power spectrum approach, quadrature approach, and hybrid approaches. All approaches attempt to find the sinusoidal oscillatory frequencies of the tremor data. These approaches have the advantage that they can accommodate changes in the biomechanics of the hand as the user adjusts their hand position to frame the image.

Sinusoidal signals are characterized by their Amplitude, Frequency, and Phase. FIG. 4A illustrates such a sinusoidal signal. Though the phase lies between −π and +π, it can be unwrapped to give a continuous unwrapped phase that has no limits. The normal (unwrapped) phase can be determine by converting the wrapped phase modulo 2π to the interval (−π, π)

Figure 5:
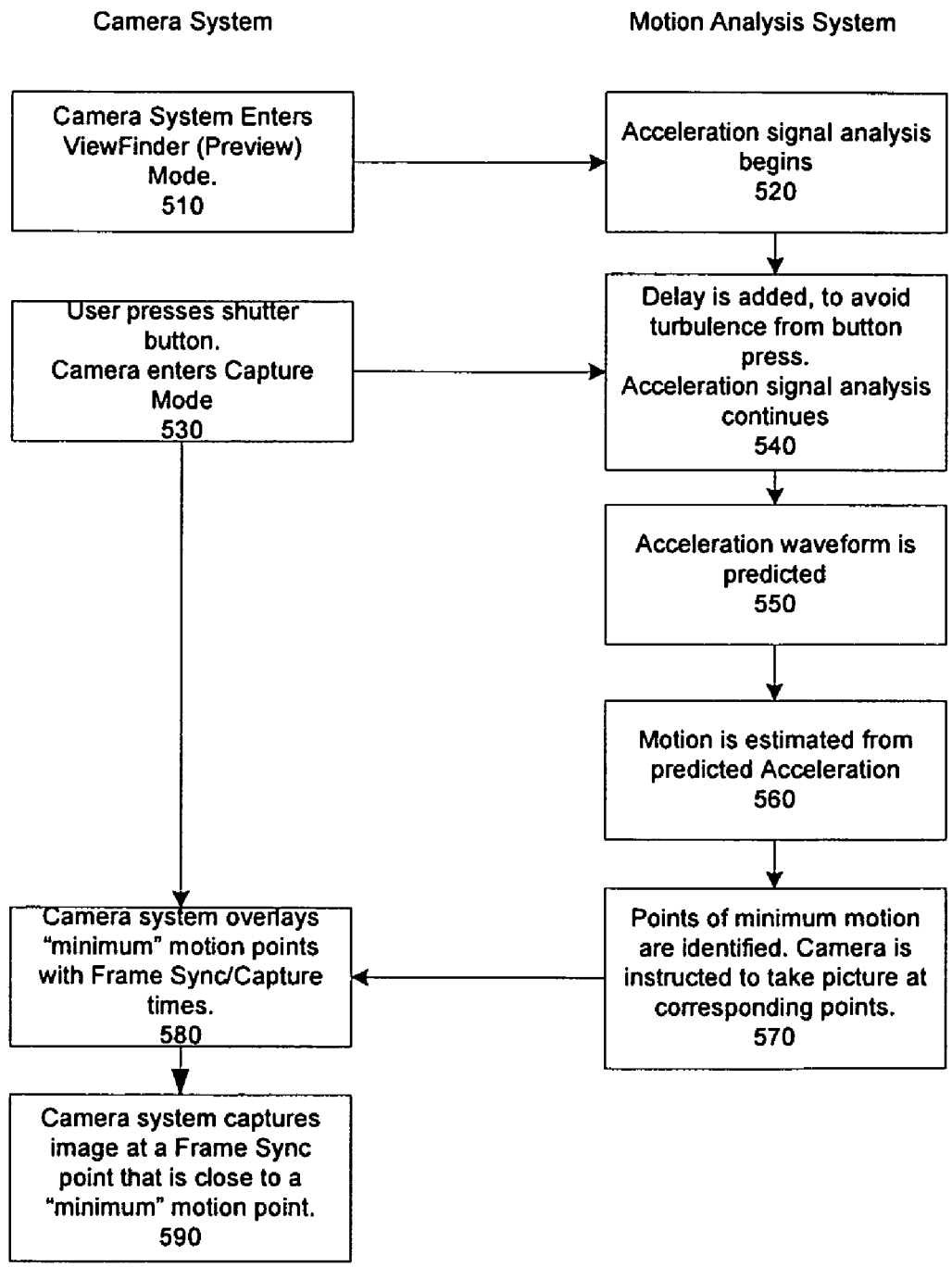
FIG. 5 is a diagram of one embodiment of improved image capture based on motion data.

FIG. 5 is a flowchart of one embodiment of the process. The Camera System closely interacts with the Motion Analysis subsystem.

In one embodiment, at block 510 a camera system enters the Preview mode where the user frames the scene. This initiates the predictive processing, at block 520. Predictive processing involves analysis of acceleration data to determine resonant frequencies, amplitudes, and phases. In one embodiment, the Preview mode is entered when the camera is positioned with the aperture open and the camera motionless.

When the user enters the Preview Mode, the Camera System notifies the Motion Analysis system. This system initiates accelerometer signal analysis, at block 520. This analysis determines parameters of the acceleration signal including resonant frequencies.

When the user presses the button, at block 530, an impulse is input to the hand-camera system. This typically changes the phase of the sinusoidal oscillation, but not the frequency. Therefore, it suffices to determine the resonant frequencies in the Preview mode, and the post-press phase, after the button press. Research has determined that cardio ballistics associated with the force of blood ejection during cardiac systole results in an impulse input to the tremor oscillations. Such impulse inputs may change the phase of oscillation. If a cardio sensor input is available, the process looks for cardio ballistic impulses, and waits for a short time delta after this input and re-predicts the acceleration waveform.

When the user presses the Shutter button, at block 530, the camera system indicates that event to the Motion Analysis system. The Motion Analysis system waits for a short time, at block 540. The short delay is to wait for severe shake associated with button press to die down.

The process then predicts the acceleration waveform, at block 550. The acceleration wave form is used, at block 560, to predict motion patterns.

At block 570, the points of minimum motion are identified from the predicted acceleration waveform. These points are communicated to the Camera System. The camera system in the meantime is running in a free video mode and is aware of the frame sync signal that precedes each frame. The camera system selects a frame sync that is closest to a predicted point of minimum motion, at block 580, and captures the frame following that frame sync, at block 590. In another embodiment, for image sensors which are capable of "force restart" which can take a picture regardless of the time when the frame sync occurs, the timing may simply rely on the predicted point of minimum motion to capture a frame.

FIG. 6A illustrates one embodiment of an approach to image blur prediction based on spectral analysis. The motion data received from the accelerometer is processed. In one embodiment, the acceleration data is first sent through a band pass filter 615 which allows frequencies in the elbow and wrist tremor range of 3-16 Hz to pass through. The filter 615 effectively removes the gravitational component of the acceleration signal. In one embodiment, similar spectral analysis systems may be set up for each tremor range. Furthermore, the bandpass filter 615 can be used to filter out normal smooth motion, such as the motion of a car moving, or a camera moving along a track. The smooth motion produces a constant velocity or constant acceleration in x direction. This velocity/acceleration is filtered out by the bandpass filter 615. In contrast, bumps manifest as a high frequency change in velocity or acceleration. In one embodiment, a high pass filter (not shown) can be added to the system in parallel with the band pass filter 615. If the output of the high pass filter exceeds a certain threshold—indicating a high frequency change, the system may delay for N milliseconds for the motion resulting from the high frequency event (a bump or a jerk) to die down before triggering the camera. This enables the use of the system in a moving vehicle such as a train or car, or camera track, while still providing the benefits to image quality.

The bandpass filter 615 further eliminates high frequency noise from consideration.

Spectral estimation techniques are used to determine the resonant frequencies in the acceleration data, at block 615. In one embodiment, periodogram method can be used as a frequency estimator. In this approach peaks in the periodogram correspond to the frequencies of interest.

In one embodiment, model based spectral estimation methods like Auto Regressive (AR) methods, Modified Covariance method, etc., can be used to fit a model to the observed data and thereby derive the frequencies of interest by spectral estimation. Without loss of generality, other spectral estimation techniques may be used to estimate the resonant frequencies. Such spectral estimation techniques may include for example Sinusoidal Frequency Estimation techniques (MUSIC, etc.)

The frequencies are then, in one embodiment, passed through a narrow band filter 620. The narrow band filter 620 is used to isolate the identified frequencies. In one embodiment, the data is passed through a bank of narrow band filters 620 at various identified frequencies. For simplicity, only a single path is shown, for one particular frequency. However, one of skill in the art would understand that there may be a filter 620, phase detector 625, amplitude detector 630 associated with each frequency.

Phase detector 625 identifies zero crossings or peaks of a signal. In one embodiment, there is a separate phase detector 625 for each frequency. Alternatively, a single phase detector 625 may handle multiple frequencies.

Amplitude Detector 630 calculates signal amplitude. In one embodiment, the signal amplitude is calculated from the peaks of the signal. Alternately, amplitude can also be derived from the Root Means Square (RMS) energy of the signal. The RMS can be determined by averaging samples over several periods:

$$\sqrt{\frac{\sum_{n=0}^{N-1} x^2}{N}}.$$ (Equation 2)

For sinusoids the RMS is $$\frac{A}{\sqrt{2}},$$

where A is the amplitude of the signals. So the Amplitude A is RMS×√2.

The amplitude and phase data is passed to prediction waveform generator 635, along with the frequency data. Given the estimated amplitudes, phase, frequency of the signal; future values of the signal are predicted. In one embodiment, the technique described with respect to Equation 1 above is used.

The predicted motion data is passed to motion predictor 640. In one embodiment, where there is only a single frequency of interest—the Simple Harmonic Motion approach is used, wherein points of minimal blur are estimated to be the peaks and valleys of the prediction signal.

In one embodiment, when multiple frequencies are involved, the acceleration data is integrated to derive velocity data. In one embodiment, the initial velocity is chosen so that the average velocity is zero. This is because generally when taking a picture, the subject continues to frame the picture when capturing an image and hence no net displacement is expected.

One embodiment of an alternative scheme to determine the amplitude and phase is shown in FIG. 6B. In this alternate scheme, motion data is passed through bandpass filter 650 to spectral estimation 655, and a Fourier transform 660. The Fourier transform 660 of the signal in the neighborhood of the desired resonant frequency is determined. The signal amplitude and phase at the desired resonant frequency can be derived by interpolating from the Fourier response of adjacent frequencies, by interpolation logic 665. This data, along with the spectral estimation data is passed to predictive waveform generator 670. The waveform data is then passed to motion detection 675.

FIG. 7 illustrates one embodiment of an approach to image blur prediction based on quadrature signal analysis. This approach is appropriate when the hand tremor can be modeled as the result of a single sinusoidal oscillation.

The data is passed through a bandpass filter 710. The bandpass filter removes data extraneous to the particular tremor or motion being analyzed. In one embodiment, as noted above, multiple filters may be used, one for each relevant slice of frequency.

The filtered data is passed to a Hilbert filter 720. The Hilbert filter generates a "Quadrature" version of the signal—which is effectively a 90 degree phase shifted version of the original signal.

The data from the bandpass filter 710 and the Hilbert filter 720 are passed together to Arc Tan block 725. Since the Hilbert filter 720 has a delay, delay 715 ensures that the original data and the data from the Hilbert filter 720 reach the Arc Tan block 725 at the same time. Alternative methods of keeping the original signal and the quadrature signal in sync may be used. Arc Tan block 725 derives the signal's instantaneous phase from the arc tangent of the original and quadrature signals.

The phase of the signal lies in the interval $(-\pi,\pi)$. This phase can be unwrapped, by Phase unwrap 730, as shown in Equation 1, so that a continuous representation of the phase is obtained. This continuous representation is calculated, since the phase has to be differentiated to determine the frequency.

Phase Smoothing filter 735 smoothes the data. In one embodiment, smoothing is applied by fitting a line locally by least squares.

The frequency is a scaled version of the derivative of the phase as shown below:

$$\theta = 2\pi f t + \phi$$ (Equation 3)

$$\frac{d\theta}{dt} = 2\pi f$$

$$f = \left(\frac{1}{2\pi}\right)\frac{d\theta}{dt}$$

The differentiator block 740 differentiates and scales its input to get an estimate of the instantaneous frequency of the signal. Note that the instantaneous frequency can also be estimated from the unwrapped phase. The instantaneous frequency is passed to narrow band filter 755. Narrow band filter 755 also receives the output of the bandpass filter 710. Narrow band filter 755 filters the signal from the bandpass filter 710 based on the instantaneous frequency data from differentiator block 740.

An amplitude detector 760 uses the output from the narrowband filter 755, and identifies the amplitude of the frequency. This data is input to prediction waveform generator 750, along with the output of differentiator 740, phase smoothing filter 735.

Prediction Waveform generator 750 calculates future values of the signal. In one embodiment, if there is only a single frequency of motion, the prediction waveform generator 750 may be eliminated, and the wave information may be directly passed on to motion predictor 760. For single frequencies, the signal can be analytically synthesized, e.g. a sine wave need not be predicted, because its peaks and zeroes are defined by its format.

The wave prediction data is the passed on to motion predictor 760 which predicts future motion in order to properly time the image acquisition.

In a hybrid approach Spectral Estimation can be used to estimate resonance frequencies in the Camera preview mode and Hilbert transform approach is used to compute instantaneous phase in the capture mode (after button press). Alternative methods of using spectral estimation and Hilbert transforms including using them in sequence or in parallel may be used.

It should be emphasized that the predictive approach need not capture an image after a button press. Since contextual motion analysis can be used to determine that the end user is about to take a picture, the picture capture can precede button press. The advantage with this approach is that the picture is captured before the force impulse of the button press introduces perturbations into the hand tremor.

Figure 8:
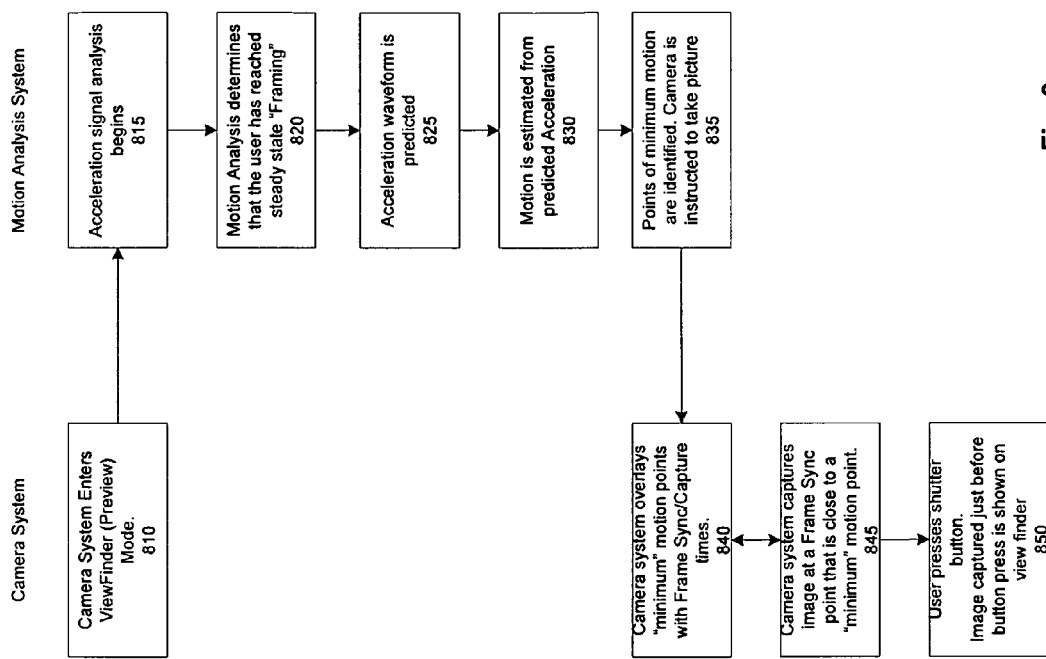
FIG. 8 is a diagram of one embodiment of improved image capture by pre-capturing an image.
Figure 9B:
FIGS. 9A-D illustrate images corrected in various ways.
Figure 9D:
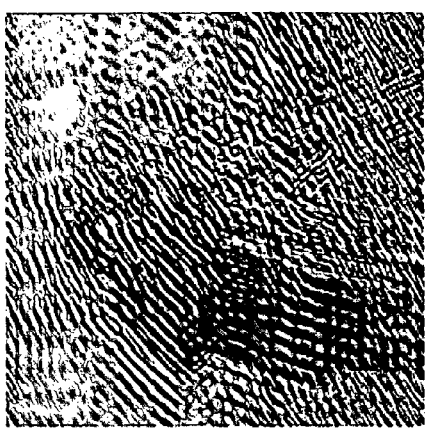
Figure 9A:
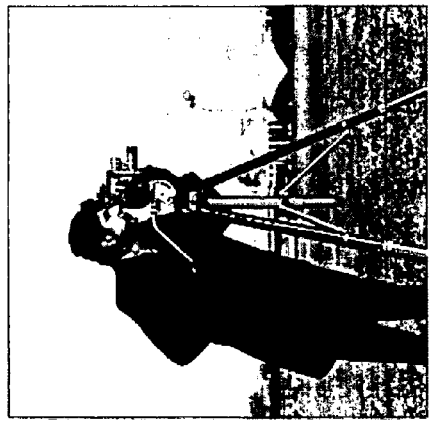
Figure 9C:
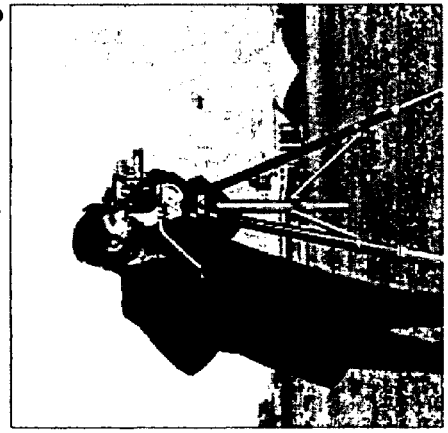

FIG. 8 is a flowchart of one embodiment of predictive image acquisition. The camera subsystem communicates to the motion analysis system that the end user has entered the camera preview mode, at block 810. Acceleration signal analysis is started, at block 815, in response to preview mode initiation.

The motion subsystem monitors the acceleration data to determine "quiescent" framing of the scene, at block 820. This can be done by monitoring the RMS values of the acceleration signals and the tilt of the device. If the RMS value is below a threshold or if the estimated tilt is close to the expected tilt for picture taking, then image capture can commence. Tilt estimation techniques for accelerometers are well known in the art. Note that "quiescent" framing may include a smooth motion, i.e. a moving camera. It is designed to remove the results of bumps and jumps and tremors. In one embodiment, the motion—excluding smooth motion which can be disregarded—is referred to as adverse motion.

The acceleration waveform is predicted, at block 825. Motion is estimated based on the predicted accelerations, block 830.

A point of minimum adverse motion is identified, and the camera is instructed to take a picture, at block 835. As noted above, the point of minimum adverse motion may still include a smooth steady motion. The camera system overlays the minimum motion points with the frame sync, to set a capture time, at block 840. The image is captured, at block 850. If a proximity sensor, if available, is used to determine if the user's finger is approaching the shutter button to trigger the timing. Picture capture is initiated unbeknownst to the user.

In one embodiment, if the user frames a picture, but then fails to actually depress the shutter, the obtained image is discarded, and the process returns to block 825, to re-predict and re-acquire an image. In one embodiment, only the picture taken within close proximity of the actual time of shutter release is retained. In another embodiment, the prior pictures may be retained as well. In one embodiment, the user may set a preference, as to the availability of predictive image acquisition, and whether any images so acquired outside the immediate range of shutter activation should be retained.

These predictive systems, described above enable an improved image acquisition. As noted above, in one embodiment, the system uses frequency and phase estimation to isolate the sinusoidal oscillations to predict the signal waveform into the future. In one embodiment, the system may use of quadrature signal techniques for determining instantaneous phase and frequency for waveform prediction for image stabilization. The system then directs the camera to capture images at the "low motion" points. In one embodiment, Simple Harmonic Motion principles are used to capture the image during peaks and valleys of the acceleration. Furthermore, by detecting the "Scene Framing," the system can be used, in one embodiment, to capture pictures before the button press using acceleration data processing and/or proximity sensor data.

In one embodiment, the motion data may also be used for post-processing—that is alteration of the image after image capture. In one embodiment, the post-processing relies on captured motion data associated with an image. In one embodiment, an image has, as meta-data, acceleration data associated with it. In one embodiment, instead of a single reading for the entire image an accelerometer reading may be available for each line of the image, or for groups of lines.

The process attempts to derive linear velocity of the camera when the picture was taken. In one embodiment, linear translational acceleration in the image sensor plane is estimated and integrated to derive the linear velocity. This velocity is used to estimate image blur.

If the device that includes the image sensor and tri-axial accelerometer is a wireless device like a cell phone, one expects minimal loading on the hand from the mass of the device. Subsequently, the major blurring of the picture will emanate from the natural oscillation frequency of the elbow. Since the elbow to hand distance is significant this oscillation will be perceived as a linear translational motion at the hand and not rotational. Therefore, compensating for linear translational motion will improve the image quality.

Small camera devices typically have wide angle camera systems (as opposed to telephoto systems) and are predominantly used in portrait mode where the subjects are relatively close to the camera. Therefore, translations of the image sensor leads to more noticeable blur than rotations (which disproportionately affect objects far from the sensor).

The motion information derived includes an estimate of direction of motion and the amount of motion. This information can be used during post-processing to remove image blur.

Significant amount of research has been done on post-processing an image to minimize the effects of motion blur. The smear at a pixel level is characterized as a "Point Spread Function" (PSF). The deblurring techniques are "blind" in that the PSF is assumed to be unknown.

However knowing the motion PSF can significantly improve the quality of reconstruction. This is illustrated in FIG. 9. In this Figure, the original image is shown, as well as a blurred version. If the correct PSF is known, the image can be reconstructed as shown in the bottom left. However, if a uniform radial blur is assumed then the picture shown at bottom right results. The classical Weiner deconvolution filter was used for this example.

In one embodiment, in the present system, a motion vector is associated with the image. Thus, the post-processing algorithms can be provided with the relevant motion vectors and thereby the motion PSF. This enables more accurate restoration of the image. In one embodiment, the PSF can be estimated for a portion of the image instead of the entire image—in one embodiment per image line—so that image restoration can be further improved.

Figure 10:
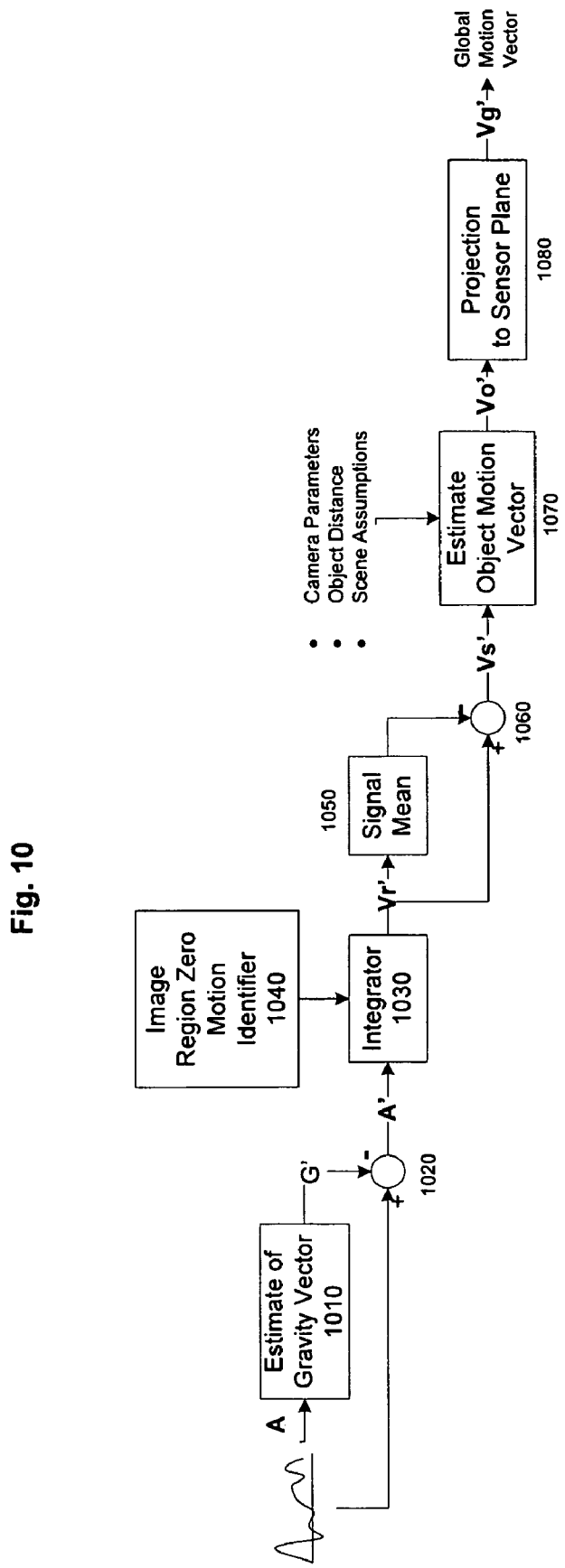
FIG. 10 is a diagram of one embodiment of generating a global motion vector.

FIG. 10 shows one embodiment of an approach to estimate the motion vector in the image plane. The motion data is input to a gravity vector estimator 1010. Gravity vector estimator 1010 can be a low pass filter or a more complex scheme such as the scheme which uses knowledge of the acceleration power density spectrum to improve the accuracy of the estimate of the gravity vector.

The estimated gravity vector G' (in camera attached coordinate system) is subtracted from the acceleration vector to get the true camera residual acceleration, A', at block 1020. In one embodiment, a steady motion, i.e. the motion of a moving vehicle or camera, may also be determined, and removed using a bandpass filter.

The residual acceleration vector A' is integrated by integrator 1030 to obtain the velocity vector. The initial condition for velocity needs to be established. This can be done in one of two ways. In one embodiment, a small region of the image (derived from the sensor) is examined for zero motion (for example, by looking for a color intensity change below a threshold across all the pixels of the region). The zero velocity point, per identifier 1040, then triggers the integrator 1030 to initiate integration with a zero velocity initial condition.

Alternately, one can assume that the average velocity is zero—since zero displacement results when the user is capturing an image. So the velocity vector Vr can be corrected by subtracting its mean value, obtained via signal mean 1050.

The resultant sensor velocity vector estimate Vs' has to be mapped to an image plane velocity Vo'. Object motion vector estimator 1070 calculates this. The sensor and object velocities differ because the objects imaged by the image sensor are displaced in the image plane based on imaging parameters, like focal length and distance of object from sensor. A ranged sensor could detect this distance or a typical distance (for example say 6 feet for portrait photography) can be assumed. The resulting 3D velocity vector is projected to the image plane, by projector 1080, to give a 2D velocity vector Vg'. This vector estimates the motion blur magnitude and direction.

The residual accelerations in the image plane estimate acceleration vector. Acceleration is integrated to get velocity. Initial velocity is set so that the average velocity is zero. This global motion vector can be used to adjust for blur on a per-image, per-line, or per set of lines level. The process of analyzing motion data by any of the above techniques can also be used when the motion data is angular velocity data generated by a gyroscope. In this case, the angular velocity can be directly used, or differentiated to obtain the angular acceleration. In one embodiment, certain of the processes described above to obtain velocities may be skipped, when velocity data is directly obtained. However, one of skill in the art understands the conversion between acceleration data and angular velocity data. The sinusoidal frequency identification techniques described above can be applied for such data as well.

The principles of motion estimation described thus far can be extended to video. Video is captured as a series of frames. The term "frame" here refers to a complete frame, a field which is an interlaced subset of a frame, a macroblock, which is a subset of a complete frame which is encoded and handled separately, or a slice.

Figure 11A:
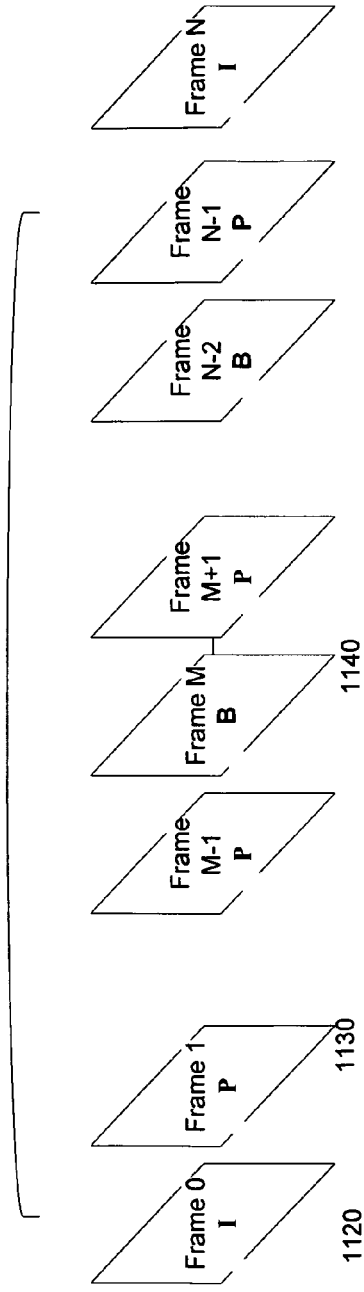
FIGS. 11A and B are diagrams of one embodiment of the frames in video.
Figure 11B:
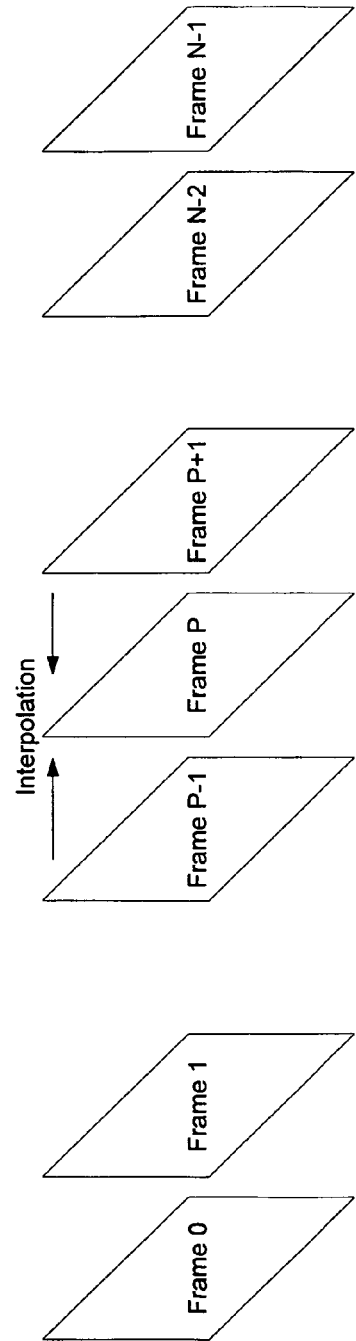

The frames are typically segmented into Groups of Pictures (GOPs) which are typically encoded wholly with reference to each other (i.e. there is no dependency on a picture outside the GOP during encoding). FIGS. 11A and 11B are diagrams illustrating the frames and the relationship between the frames. The frames/pictures in the GOP 1110 are classified as:

I: Intra coded pictures 1120. These pictures are also called "Anchor" frames and are coded relative to themselves. These are the first and last frames of a GOP.

P: Predictive Frames 1130. These frames are coded relative to a reference frame—usually the I frame in the GOP, and sometimes another P frame. First the relative motion between 16×16 pixel blocks of the P frame and its Reference Frame is estimated locally as Motion vectors. Then the difference between the P frame block and its corresponding Reference area is coded.

B: Bidirectional Frames 1140. These frames are coded relative to adjacent I and/or P frames on both sides.

The I-frames 1120 are key anchor frames. Thus, I frames need to be high quality, since the P and B frames are predicted relative to the I frame.

Figure 12:
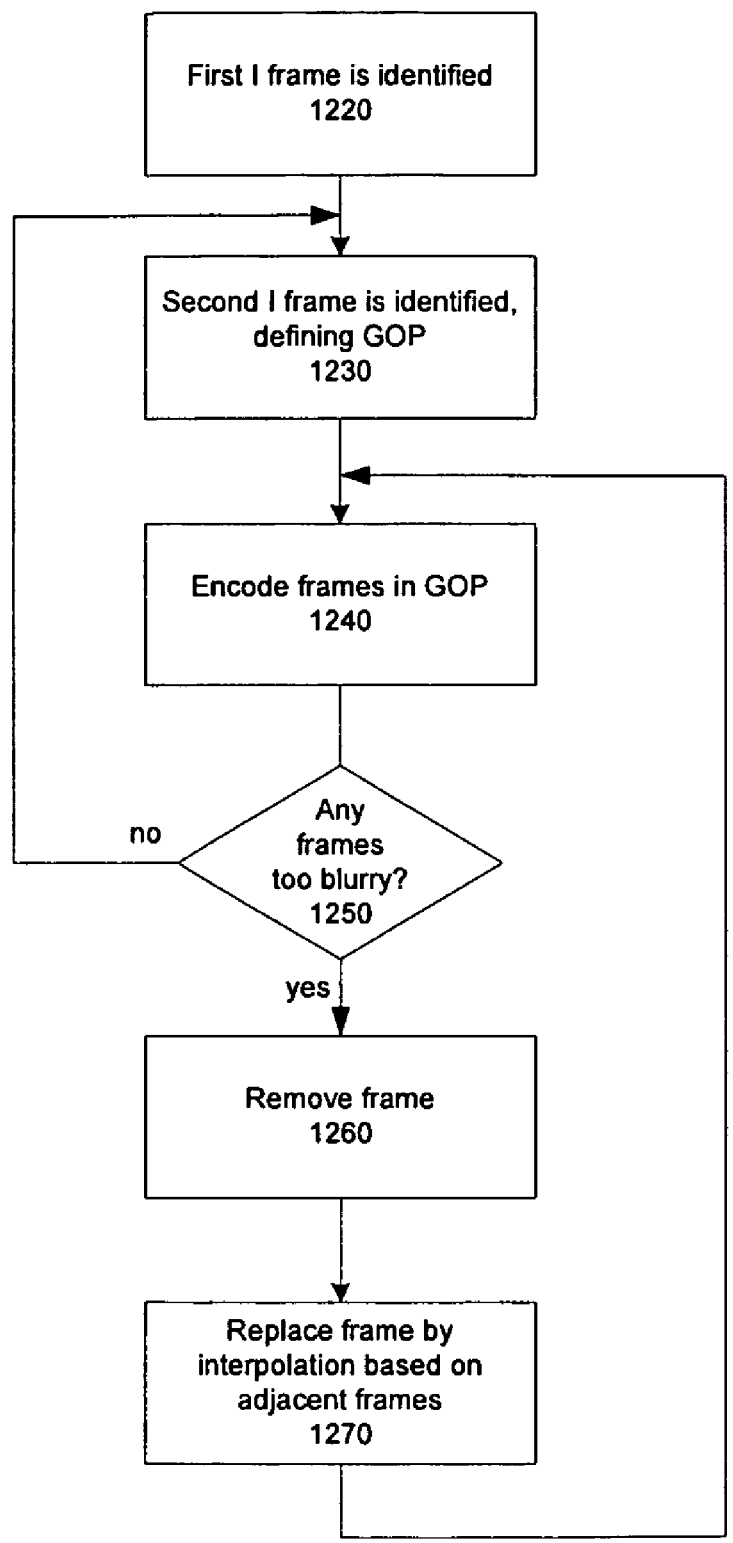
FIG. 12 is a diagram of one embodiment of improving image quality in video.

FIG. 12 is a diagram of one embodiment of improving image quality in video. This is a post-processing, in one embodiment done as the video is being encoded for storing and/or replay. The process starts at block 1210.

At block 1220, a first I frame is selected. The first I frame is the first frame that has minimal global motion. Any one of the processes described above may be used to identify such a frame.

At block 1230, a second I frame is selected. In one embodiment, the second I frame meets to requirements. First, it is within an acceptable set of frames from the first I frame to form a GOP. Second, it represents a point of minimal motion. Note that the term "minimal motion" refers here to a global motion vector which is smaller than the global motion vector of other available frames. The area between these two I-frames defines the GOP.

At block 1240, the process starts encoding the frames in the GOP.

At block 1250, the process determines whether any of the P-frames or B-frames in the GOP is heavily blurred, based on predicted motion. If not, the process completes the encoding, and continues to block 1280.

If so, at block 1260, the heavily blurred frame is removed. At block 1260, a replacement frame is interpolated based on adjacent frames. Any of several known frame interpolation techniques can be used. Alternately specific lines can be interpolated when per line motion estimation is available and it is determined that there was significant motion in the time a video line was captured.

The process then returns to block 1230, to pick a new I frame, to define another GOP. This process is repeated until all of the frames have been encoded/compressed.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:
   receiving motion data of an image capture device;
   applying the received motion data to a model that models tremor motion about a users joints and limbs as an approximation of a simple harmonic motion to determine one or more sinusoids that describe the motion of the image capture device, wherein the model is based on biomechanical data that defines a range of human arm motion;
   selecting a time at which to capture image data by the image capture device, the time corresponding to a predicted point of minimum adverse motion of the image capture device based on the determined one or more sinusoids; and creating an improved image based on the one or more sinusoids by capturing image data at the selected time.

2. The method of claim 1, wherein the sinusoids are derived from acceleration vectors.

3. The method of claim 1, wherein the sinusoids are derived from one or more of the following: velocity vectors, angular velocity vectors, acceleration vectors.

4. The method of claim 1, wherein the received motion data includes acceleration vectors and determining the one or more sinusoids includes predicting an acceleration waveform based on the acceleration vectors, the method further comprising:

estimating motion corresponding to biomechanical tremor of a user interacting with the camera based on the acceleration waveform and the biomechanical data; and identifying the predicted points of minimum adverse motion based on the motion estimation.

5. The method of claim 4, further comprising:
overlaying a point of minimum adverse motion with a frame sync signal; and
activating an image capture mechanism at a frame sync point that is close to the point of minimum adverse motion.

6. The method of claim 4, further comprising:
utilizing spectral estimation to predict the acceleration wave form.

7. The method of claim 6, further comprising:
utilizing a bandpass filter, and a narrow band filter to isolate a frequency; and
detecting phases and amplitudes of the frequencies, the phases and amplitudes utilized for the prediction of the acceleration waveform.

8. The method of claim 4, further comprising:
utilizing a quadrature filter to calculate a phase shifted signal;
calculating phase based on the phase shifted signal and the original signal; and
predicting the waveform based on an amplitude and the phase.

9. The method of claim 1, wherein creating the improved image comprises removing blur from an image in post processing on the basis of the biomechanical data and the received motion data.

10. The method of claim 9, further comprising:
calculating a global motion vector based on the motion data; and
adjusting a captured image based on the global motion vector.

11. The method of claim 10, wherein the global motion vector is a constant for a sub-portion of the captured image, and the adjusting is for the sub-portion.

12. The method of claim 1, further comprising, in a video:
identifying a frame having minimal global motion;
designating the frame as an I frame for encoding purposes.

13. The method of claim 12, further comprising:
identifying a blurry frame based on projected motion calculated from the received motion data and the biomechanical information;
removing the blurry frame; and
replacing the blurry frame with a frame interpolated from adjacent frames.

14. The method of claim 1, further comprising:
receiving data from a cardiac sensor that indicates cardio ballistic impulses of a user of the media capture device; and
utilizing the data from the cardiac sensor to delay the prediction of the sinusoids for a period of time after the cardio ballistic impulses were received.

15. The method of claim 1, further comprising:
a proximity sensor input to initiate prediction and capture process prior to actual shutter press.

16. An image improvement system for an image capture device, the system comprising: a receiving logic to receive motion data of the image capture device; a sinusoidal signal analysis logic to apply the received motion data to a model that models tremor motion about a users joints and limbs as an approximation of a simple harmonic motion to calculate one or more sinusoids that describe the motion of the image capture device, wherein the model is based on biomechanical data that defines a range of human arm motion; and a pre-processing system to select a time at which to capture image data, the time corresponding to a predicted a point of minimum motion of the image capture device based on the determined one or more sinusoids; wherein the image improvement system creates an improved image based on the one or more sinusoids by capturing the image at the selected time.

17. The system of claim 16, wherein the sinusoids are derived from one or more of the following: velocity vectors, angular velocity vectors, acceleration vectors.

18. The system of claim 16, further comprising:
a minimum motion identification logic to estimate motion corresponding to biomechanical tremor of a user interacting with the image capture device based on the sinusoids and to identify the points of minimum motion; and
an overlay logic to overlay the points of minimum motion with a frame sync signal; and
a shutter logic to activate an image capture mechanism at a frame sync point that is close to the point of minimum motion.

19. The system of claim 18, further comprising:
a proximity sensor input to initiate prediction and capture process prior to actual shutter press.

20. The system of claim 16, further comprising:
a bandpass filter to isolate a frequency;
a spectral estimator to predict the acceleration wave form; and
a phase detector and an amplitude detector to identify phases and amplitudes of the frequency, the phases and amplitudes utilized for the calculation of the one or more sinusoids.

21. The system of claim 16, further comprising:
a quadrature filter to calculate a phase shifted signal;
an ArcTan calculator to calculate phase based on the phase shifted signal and the original signal; and
a prediction waveform generator to predict a waveform based on an amplitude and the phase.

22. The system of claim 16, further comprising a post-processing system to create the improved image by removing blur from an image on the basis of the biomechanical data and the received motion data.

23. The system of claim 22, further comprising:
a global motion vector calculator to calculate global motion vectors based on the motion data; and
image restoration logic to adjust a captured image based on the global motion vector.

24. The system of claim 23, wherein the global motion vector is a constant for a sub-portion of the captured image, and the adjusting is for the sub-portion of the captured image.

25. The system of claim 23, further comprising, in a video:
the global motion vector calculator to identify a frame having minimal global motion; and
the image restoration logic to designate the frame as an I frame for encoding purposes.

26. The system of claim 23, further comprising:
the image restoration logic to identify a blurry frame, remove the blurry frame, and replace the blurry frame with a frame interpolated from adjacent frames.

27. The system of claim 16, further comprising:
a cardiac sensor to detect cardio ballistic impulses of a user of the media capture device; and
a minimum motion identification logic utilizing data from the cardiac sensor to delay the calculation of the sinusoids for a period of time after the cardio ballistic impulses are detected.

* * * * *